United States Patent
Twist

[15] 3,655,233
[45] Apr. 11, 1972

[54] TONGS FOR SUSPENDING GLASS SHEETS

[72] Inventor: Douglas Twist, Hollywood, near Birmingham, England

[73] Assignee: Pilkington Brothers Limited, Liverpool, England

[22] Filed: Feb. 5, 1970

[21] Appl. No.: 8,958

[30] Foreign Application Priority Data

Feb. 14, 1969 Great Britain..........................8,254/69

[52] U.S. Cl. ............................................................294/118
[51] Int. Cl. .............................................................B66c 1/48
[58] Field of Search................294/97, 104.1, 106, 108, 111, 294/118

[56] References Cited

UNITED STATES PATENTS

| 2,297,291 | 9/1942 | Danielson | 294/118 |
| 3,273,933 | 9/1966 | Jochim | 294/118 |
| 2,174,254 | 9/1939 | Black | 49/14 |
| 2,991,113 | 7/1961 | Richardson | 294/118 |
| 2,705,658 | 4/1955 | Barchoff | 294/118 |

FOREIGN PATENTS OR APPLICATIONS 937,004   9/1963   Great Britain..........................294/118

Primary Examiner—Evon C. Blunk
Assistant Examiner—Johnny D. Cherry
Attorney—Imirie, Smiley, Snyder and Butrum

[57] ABSTRACT

Tongs for supporting glass sheets vertically during thermal treatment provide a pair of jaws for gripping the opposed faces of a glass sheet adjacent its upper edge. Each jaw includes a gripping member having an elongated knife-edge, the knife-edges being directed towards each other for gripping engagement with the opposed faces of the glass sheet.

1 Claims, 3 Drawing Figures

Patented April 11, 1972
3,655,233
2 Sheets-Sheet 2
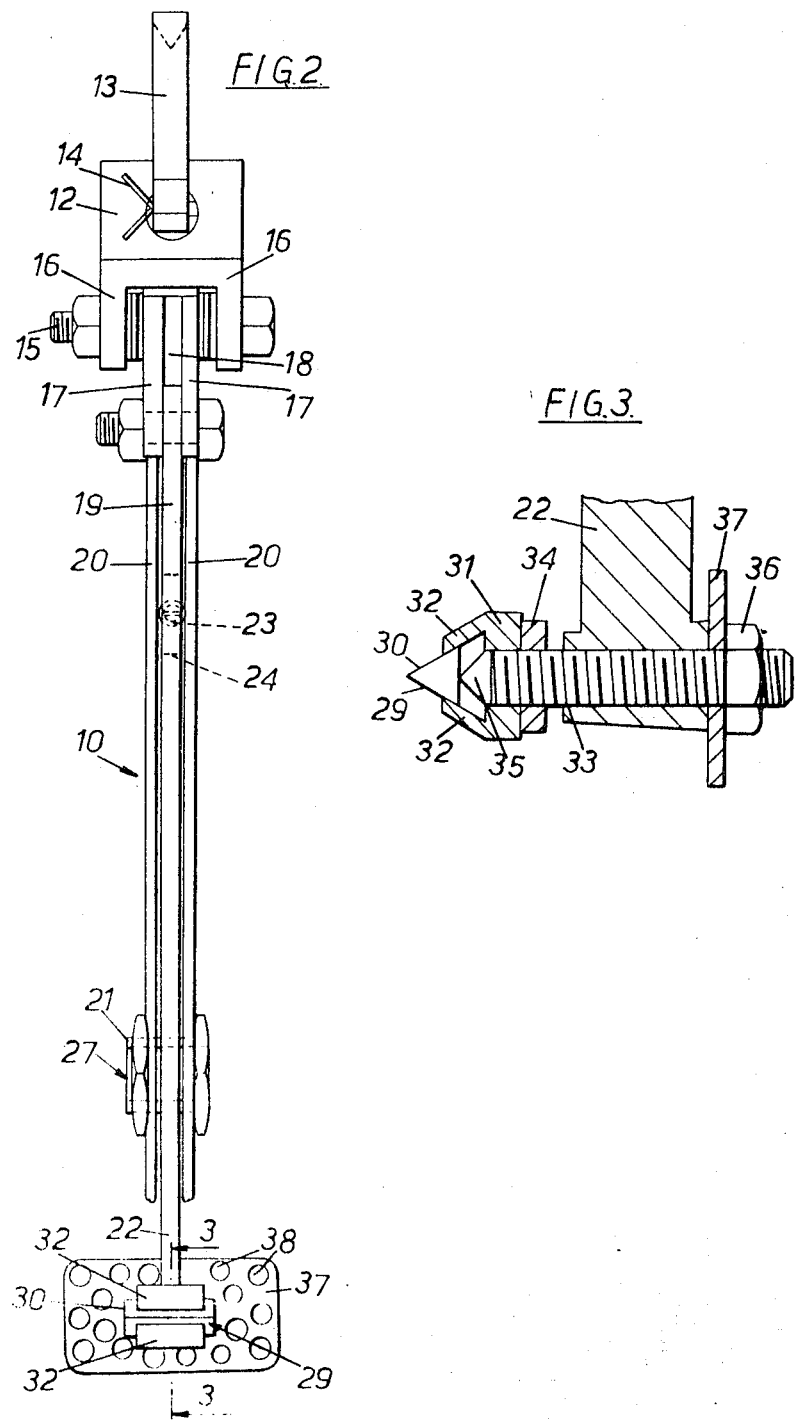
Inventor
DOUGLAS TWIST
By
*Imirie, Smiley, Snyder and Butrum* Attorney

TONGS FOR SUSPENDING GLASS SHEETS

BACKGROUND OF THE INVENTION

This invention relates to tongs for the vertical suspension of glass sheets during thermal treatment.

Tongs are commonly used for supporting glass sheets vertically for thermal treatment by gripping the opposite faces of a glass sheet adjacent its upper edge. The tongs are suspended from an overhead conveyor which extends through a furnace for heating the glass sheet to its softening temperature, and from the furnace, for example, to a quenching station where the glass sheet is rapidly cooled to toughen it, or to a bending station where the glass sheet is bent to a desired form.

Two problems require to be solved in suspending the glass sheet for such treatment. Firstly, the suspension must be capable of holding the glass sheet when cold, as no penetration of the glass sheet can occur. Secondly, when the glass sheet becomes heated to a high temperature, e.g. 690° C. to 710° C. as in the case of soda-lime-silicate glass penetration of the glass occurs and this penetration must be controlled if the glass sheet is not be be damaged.

SUMMARY

Tongs for supporting glass sheets vertically during thermal treatment comprise tong arms pivoted together by a hinge pin and extending beyond the hinge pin to provide a pair of jaws for gripping the opposed faces of a glass sheet adjacent its upper edge. Each jaw includes a gripping member having an elongated knife-edge, said knife-edges being parallel or substantially parallel and being directed towards each other for gripping engagement with the opposed faces of the glass sheet.

Each gripping member is preferably of triangular cross-section and provides a generally upward facing, flat surface leading from said knife-edge for contact with the adjacent face of the glass sheet on partial penetration of the gripping members with the respective faces of the glass sheet.

As the glass sheet is heated in a furnace it gradually softens, and thus with the above arrangement, the area of contact between the glass sheet and said surfaces of the gripping members constantly increases as the gripping members penetrate further into the adjacent faces of the glass sheet which increasing surface area serves to limit the extent of penetration.

BRIEF DESCRIPTION OF THE DRAWINGS

FIG. 2 is a sectional front elevation taken along line 2—2 in FIG. 1, and FIG. 3 is an enlarged section along line 3—3 in FIG. 2, the section being taken through one of the tong jaws.

DESCRIPTION OF THE PREFERRED EMBODIMENT

Figure 1:
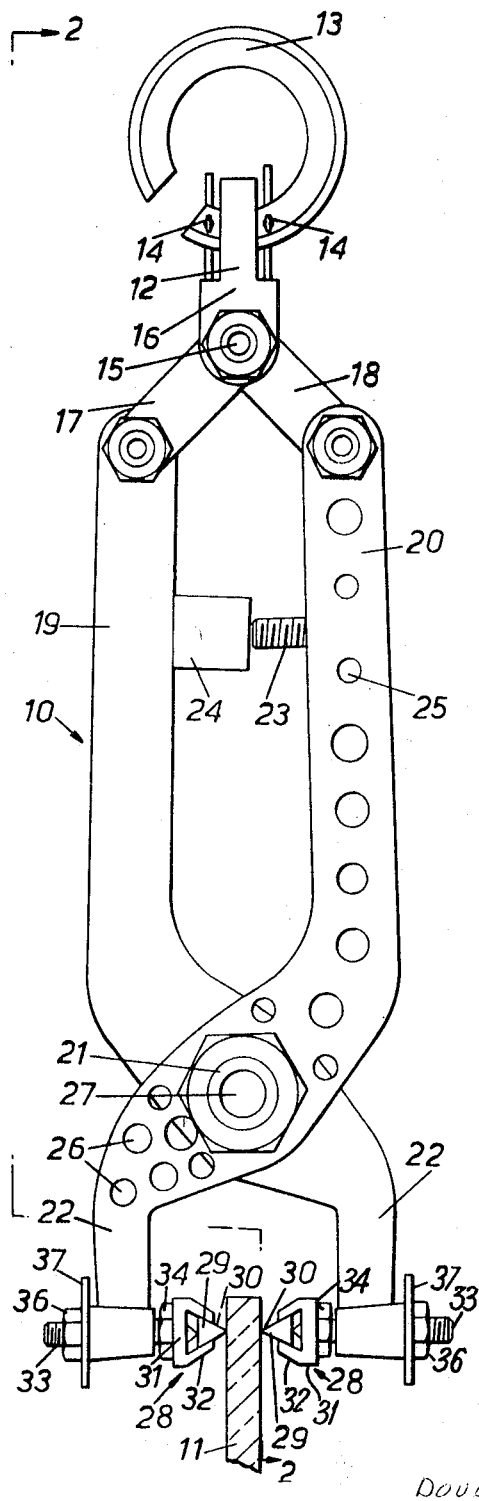
FIG. 1 is a side elevation, by way of example, of tongs for the vertical suspension of glass sheets, the figure showing a glass sheet being held between the gripping members of the tongs.

With reference to the drawings, there is shown a pair of tongs 10 by means of a number of which a glass sheet 11 may be suspended vertically for transport through a furnace in order to heat the glass sheet to near its softening point. After the glass sheet has been transported through the furnace it may be transferred to a quenching station, where the glass sheet is toughened by the application of a quenching fluid to cool the glass sheet. Alternatively, the glass sheet may be transferred to a bending station where the glass sheet is bent into conformity with a pair of bending dies, and then subsequently toughened by passing into a quenching station.

The tongs 10 comprise a suspending bar 12 of rectangular cross-section, which bar has at its upper end a C-shaped support ring 13 for attachment of the tongs to a conveyor mechanism (not shown). One end of the support ring 13 passes through a hole in the suspending bar 12 and is held therein by a pair of split pins 14 one on either side of the suspending bar.

The lower end of the suspending bar is forked and a threaded pin 15 is passed through the arms 16 of the forked end to provide an upper hinge pin for the tongs 10. Attached to the upper hinge pin, are three tong links 17, 18 arranged so that the two links 17 are on the left-hand side as viewed in FIG. 1 and the single link 18 is on the right-hand side as viewed in FIG. 1. To the upper end of the left-hand pair of tong links 17 is pivoted a single tong arm 19, while to the other end of the single right-hand tong link 18 is pivoted a pair of tong arms 20.

The two sets of tong arms 19, 20 are bent towards each other at their lower ends in the manner of a pair of pincers and are articulated together by a lower hinge pin 21. The axes of both the upper hinge pin 15 and the lower hinge pin 21 extend parallel to the upper edge of the glass sheet 11 being suspended from the tongs. Both sets of tong arms 19, 20 extend downwardly below the lower hinge pin 21 to provide a pair of jaws 22, the pair of tong arms 20 being joined at a point below the lower hinge pin 21 in order that they form a single jaw 22. These jaws 22 tend to move towards one another, but the maximum closure of the jaws is limited in accordance with the initial adjustment of a set screw 23 carried between the upper parts of the pair of tong arms 20 for engagement with a stop 24 carried by the upper part of the single tong arm 19.

In order to provide for overall balance in the tongs, which would otherwise be unbalanced due to the unsymmetrical arrangement of tong links 17, 18 and tong arms 19, 20, holes are drilled through each of the tong arms 20. The number and size of the holes 25 is determined by the need to obtain a precise balance in the assembled tongs, to avoid any twist about the axis of the upper hinge pin which would otherwise be transferred to the glass sheet. It is to be appreciated that the glass sheet when heated to a high temperature is extremely soft and is easily subjected to distortion. Additional holes 26 may also be provided in the parts of the tong arms 20 which extend below the lower hinge pin 21, in order to equalize the heat absorption of the jaws 22 and the adjacent portions of the tong arms 19, 20, since these parts are closely adjacent to the upper edge of the glass sheet 11.

As is clearly seen in FIG. 2, at the lower hinge, the opposed flat faces of the single tong arm 19 pass between the corresponding flat faces of the pair of tong arms 20. The lower hinge is thus constructed as a mortice and tenon joint, as opposed to the conventional half-lap joint, in order to minimize distortion of the joint as a result of metal creep. Also, in order to reduce the mass of metal formed by the assembled lower hinge, which tends to absorb heat and detract from the uniform heating of the glass sheet, a hole 27 is bored through the centre of the lower hinge pin 21.

The tong jaws 22 are provided with a pair of gripping devices 28, which will now be described, for holding between them the glass sheet 11 adjacent its upper edge.

These gripping devices 28 have inwardly directed gripping members 29 which are pressed together, by means of the forces exerted on them by the tong arms 19,20, and are provided with parallel knife-edges to engage and grip the opposed faces of the glass sheet 11.

In this example, each gripping member 29 comprises an elongated prism of triangular cross-section having one of its apices directed towards the adjacent face of the glass sheet. Also, the prism-shaped gripping member 29 extends parallel to the upper edge of the glass sheet (see FIG. 1), thereby presenting a generally upward facing, flat surface 30 leading from the knife-edge for contact with the adjacent face of the glass sheet on partial penetration of the gripping member therein. The amount of penetration of the gripping member will determine the area of the said flat surface 30 which is contacted by the glass sheet. It has been found that this progressively increasing area of contact between the glass sheet and the flat surfaces 30 of the gripping members acts to limit the amount of penetration of the gripping members.

The gripping members 29 are formed from a bonded granular refractory material which consists predominantly of a refractory abrasive, e.g. silicon carbide. The use of bonded granular refractory material for the gripping members assists the gripping action of the glass sheet, when the sheet is cold.

Each gripping member 29 is held in a U-shaped shoe 31 having convergent arms 32 to enclose the rear part of the gripping member and thereby to hold the gripping member captive. The gripping member 29 is locked in its shoe by a bolt 33 and a lock nut 34, the bolt having a rounded head 35 for engagement with the vertical base of the gripping member 29 to press the other surfaces of the gripping member 29 into engagement with the arms of the shoe 31. The assembly of gripping member 29 and shoe 31 is mounted on its respective jaw 22 by an extension of the bolt 33 passing through a threaded hole in the jaw. A further lock nut 36 is provided to maintain the setting of the gripping member when the correct adjustment relative to the jaw, has been achieved.

As shown in FIGS. 1 and 3 of the drawings, each gripping member 29 has a cross-section of an equilateral triangle. Such a cross-section is provided to enable each gripping member 29 to be removed from its mounting shoe 31 and then reinserted into the same shoe with a new contact surface 30 disposed for gripping engagement with the adjacent face of the glass sheet, when one of the surfaces is worn.

When the glass sheet is passing through the furnace, the gripping devices of the tongs are exposed to a high temperature and may therefore be subjected to deterioration in their performance. In order to reduce the direct exposure of the gripping devices, a heat shield or deflecting plate 37 may be provided on the outside of each jaw 22. In this example, each heat shield 37 is held in place by the respective bolt 33 and the further lock nut 36. So as to decrease the heat absorbed by the heat shields, holes 38 may be drilled in their surfaces in order to reduce their mass.

The method of operating the tongs 10 will now be described. A number of sets of tongs 10 are suspended from a horizontal conveyor which passes through a furnace. A cold glass sheet 11 is loaded into the suspended tongs by placing the upper edge of the sheet within the jaws 22 of each set of tongs, and allowing the gripping members 29 to close onto the opposed faces of the glass sheet to grip it therebetween. The gripping members, at this stage, do not penetrate the faces of the glass sheet, but merely grip the glass sheet through the frictional forces exerted by the line contact of each gripping member and the glass sheet, i.e. along the operative apex or knife-edge of the gripping member 29.

The glass sheet is then conveyed into the furnace, where it is progressively heated up to a high temperature, e.g. of the order of 700° C., by passing through progressive steps of heating. As the glass sheet heats up, the gripping members 29 gradually begin to penetrate the opposed faces of the sheet. As this penetration takes place, the area of contact progressively increases until sufficient surface area is provided to hold the heated glass sheet. This final area of contact between the gripping members 29 and the glass sheet is ultimately controlled by the initial setting of the set screw 23 in relation to the stop 24.

After the glass sheet has been heated to its correct temperature, it is rapidly transferred to either a bending or a quenching station, where it is bent into conformity with bending dies or rapidly quenched in order to toughen it.

The invention is not restricted to the specific details of the embodiment described above. For example, the set screw 23 and the stop 24, although preferably provided between the upper parts of the tong arms 19, 20, may be provided below the lower hinge pin 20, between the jaws 22.

Also, although it is essential that the gripping members 29 provide knife-edges for making contact with the glass sheet to be suspended, the members may have a cross-section other than triangular, for example that of a rhomboid or a diamond.

The bonded granular refractory material used for the gripping members 29 is a material which is resistant to heat, corrosion and spalling at elevated temperatures near to the softening point of the glass, is mechanically strong, and has a high coefficient of friction relative to the surface of polished glass.

Aluminium oxide, zirconium oxide, chromic oxide or diamond may be used instead of the above-mentioned bonded granular silicon carbide. Also, a combination of two or more of these refractory abrasive materials may be used.

The granular refractory abrasive material forming the gripping members 29 may be in the form of particles which are situated together or combined with a heat resistant bonding medium which binds the particles into a solid matrix.

In another embodiment the gripping members 29 may comprise clamping faces of a granular refractory abrasive material deposited to form a spiculate surface 30 by a flame spraying process upon solid supports of heat-resisting steel. Alternatively, the granular refractory abrasive material is in layer form prepared by plating on to the solid supports to the full depth of the grain using a high melting point metal.

I claim:

1. Tongs for supporting glass sheets vertically during thermal treatment, comprising tong arms pivoted together by a hinge pin and extending beyond the hinge pin to provide a pair of jaws for gripping the opposed faces of a glass sheet adjacent its upper edge, each jaw including a gripping member formed of bonded granular refractory material and having the cross-section of an equilateral triangle providing three knife-edges each extending parallel to the axis of said hinge pin and any of which knife-edges may be selected to present a generally upward facing, flat surface leading from said selected knife-edge for contact with the adjacent face of the glass sheet on partial penetration of the gripping members into the opposed faces of the glass sheet, and each gripping member being removably mounted in a shoe whose position is adjustable along the line of movement of the respective jaw, which shoe has arms which partially enclose the respective gripping member and thereby hold it captive in the shoe.

* * * * *